| United States Patent [19] | [11] | 4,065,319 |
| --- | --- | --- |
| Desmarais | [45] | Dec. 27, 1977 |

[54] TILE CEMENTS

[75] Inventor: Armand Joseph Desmarais, New Castle, Del.

[73] Assignee: Hercules Incorporated, Wilmington, Del.

[21] Appl. No.: 633,061

[22] Filed: Nov. 18, 1975

[51] Int. Cl.$^2$ .................... C04B 7/353; C04B 13/00
[52] U.S. Cl. ...................................... 106/93; 106/315
[58] Field of Search ................................. 106/93, 315

[56] References Cited

U.S. PATENT DOCUMENTS

| 2,580,565 | 1/1952 | Ludwig | 106/93 |
| --- | --- | --- | --- |
| 2,852,402 | 9/1958 | Shell | 106/93 |
| 3,198,644 | 8/1965 | Simonson | 106/93 |
| 3,243,307 | 3/1966 | Selden | 106/93 |
| 3,483,007 | 12/1969 | Hook | 106/93 |
| 3,528,832 | 9/1970 | Ericsson et al. | 106/93 |
| 3,788,869 | 1/1974 | Batdorf et al. | 106/93 |
| 3,847,630 | 11/1974 | Compernass et al. | 106/93 X |

Primary Examiner—Patrick P. Garvin
Assistant Examiner—William G. Wright
Attorney, Agent, or Firm—William S. Alexander

[57] ABSTRACT

Improvements in ceramic wall and floor tiles are effected by incorporating therein as a water retention aid phenyl hydroxyethyl cellulose-hydroxyethyl cellulose, benzyl hydroxyethyl cellulose or ethyl hydroxyethyl cellulose having specified substitution levels.

1 Claim, No Drawings

TILE CEMENTS

This invention relates to novel compositions useful as mortar for the installation of ceramic wall and floor tiles. More specifically, it relates to such a cement containing a novel water-retention agent.

The physical characteristics of a cured conventional hydraulic cement or mortar are determined by the rate of curing and thus by the rate of water removal therefrom during the curing operation. Any influence which affects these parameters by increasing the rate of water removal or by diminishing the water concentration in the mortar at the onset of the curing reaction can cause a deterioration of the physical properties of the mortar. Most ceramic tile, on its unglazed surfaces, is highly porous and, when set on such a mortar, absorbs water therefrom, leading to the difficulties just mentioned. Likewise, most strata to which these tiles are applied such as wallboard, cinderblock, or masonry, are also porous and lead to the same problems.

To overcome, or at least minimize, the above-mentioned water-losing tendencies, it has been proposed to add to the mortar compositions a small amount of a water-soluble polymer such as methylcellulose (U.S. Pat. No. 2,934,932) or hydroxyethyl cellulose (U.S. Pat. No. 3,243,307) as a water retention aid. These polymers prevent escape of the water from the cement by increasing the viscosity of the water phase, thus maintaining the desired water concentration in the mortar during curing.

In accordance with this invention, it has been found that improved tile mortars can be prepared if, instead of hydroxyethyl cellulose, a modified hydroxyethyl cellulose containing clearly defined amounts of an additional substituent group is employed as the thickener or water retention aid. Specifically, the modified hydroxyethyl cellulose is one having a phenyl hydroxyethyl, benzyl group or ethyl substituent in addition to the hydroxyethyl group. More specifically, the hydroxyethyl cellulose is one having hydroxyethyl substitution between about 1.5 and 2.8 M.S. and a second substituent selected from the class consisting of a. phenylhydroxyethyl at a level between about 0.04 and 0.3 D.S.;
b. benzyl at a level between about 0.04 and 0.3 D.S.; and
c. ethyl at a level between about 0.6 and 1.0 D.S.

Preferably, the hydroxyethyl M.S. will be between about 1.6 and 2.0, and phenylhydroxyethyl or benzyl substitution will be between about 0.06 and 0.1.

The designation M.S. refers to the moles of hydroxyethyl substituent groups combined per average cellulosic anhydroglucose unit. The designation D.S. refers to the number of hydroxyl groups per average cellulosic anhydroglucose unit which have been substituted by benzyl, ethyl or phenylhydroxyethyl groups.

When compared with the mortars prepared with conventional hydroxyethyl celluloses as the water retention agent, the mortars of this invention are improved in texture, set times, and adjustability times, three important parameters used widely in the art to characterize tile mortars. They also show improvement in tack and cohesiveness. Set time is defined in ASTM C266-65. Adjustability time is the time during which the position of the tile on the wall can be changed without the tile coming loose from the mortar.

The modified hydroxyethyl celluloses which can be used as thickeners in the mortars of this invention are prepared by reacting the appropriate ether-forming compound with hydroxyethyl cellulose in a strongly alkaline medium. In the case of the phenylhydroxyethyl derivative the modifying compound is styrene oxide; in the case of the benzyl derivative, the modifying compound is benzyl chloride; and in the case of the ethyl derivative, it is ethyl chloride. Specific techniques for carrying out the etherification are well known in the art and any known procedure can be employed.

The hydroxyethyl cellulose which forms the basis for the modified ethers of this invention can be substantially any normally water-soluble grade having M.S. between 1.5 and 2.8. The preferred materials are those of medium viscosity, i.e., between about 4500 and 6500 cps. in 2% water solution. Materials of higher and lower viscosity can also be used advantageously, however.

The substitution levels of the second ether substituent have been found to be quite critical to the use of the products in tile cements according to this invention. In particular, the upper limit is critical. If the benzyl or phenylhydroxyethyl D.S. is greater than about 0.15, the mortar becomes stringy and very difficult to mix. The mortar also shows increased sagging of tiles applied therewith when used on a vertical surface. More than 0.04 benzyl or phenylhydroxyethyl D.S. is required to lower the set time of the mortar to the desired level.

A tile mortar based on Portland cement can be prepared containing only Portland cement and the water retention aid of the instant invention. Normally, however, the simplest formulation will include a rather substantial amount of sand as an extender for the relatively expensive Portland cement.

The amount of hydraulic cement can be as high as 99.4% in the case of a mortar containing only hydraulic cement and the modified hydroxyethyl cellulose to as little as about 24% in the case of mortars containing sand and other constituents. Sand, if used, should be present in the amount of from one to three volumes of sand per volume of hydraulic cement. For setting porous tiles a mixture containing equal volumes of hydraulic cement and sand up to one volume of hydraulic cement per 1¼ volumes of sand produces a mortar which is entirely satisfactory.

The preferred dry mortar composition contains finely divided inorganic or organic fibers, such as, for example, asbestos, mineral wool, glass fibers, fibrous low substitution or crosslinked carboxymethyl cellulose, and the like, in amount of from 1 to 2%. The incorporation of the fibers improves the thixotropic properties of the mortar, i.e., the use of fibers prevents sag of the mortar. Using a mortar containing fibers to bond ceramic tile to a vertical wall lessens the tendency of the tile to slip down the wall during setting of the mortar. Polyvinyl alcohol in small amount, about 0.1 to 2%, based on the weight of the hydraulic cement, is frequently included to increase adhesion and bond strength, reduce shrinkage and attain better workability.

Thus, the hydraulic cement dry mixture of this invention consists essentially of from 24% to 99.4% hydraulic cement; from 0.4% to 4% of the modified hydroxyethyl cellulose; from 0% to 75% sand; and from 0% to 2% fibers.

This dry mixture, when added to water, forms a thin-set mortar, i.e., a mortar which can be used in thin layers on the order of ⅛ to ¼ inch. The amount of water used is such that the resultant mixture will not be so thin as to slide down a wall or drop off a ceiling when applied. In general, from about 25% to 40% water by weight, based on the weight of the dry mixture, gives good results.

In the examples which follow, the invention will be illustrated by a series of cement compositions containing benzyl and phenylhydroxyethyl-hydroxyethyl cellulose. In Examples 1 through 25, three formulations, designated below as "A", "B" and "C" were employed. These formulations were as follows:

|  | A |  | B |  | C |  |
|---|---|---|---|---|---|---|
| White Portland cement | 48.4 | parts (wt.) | 98.4 | parts (wt.) | 29.7 | parts (wt.) |
| Fine sand | 50.0 | " | — |  | 68.7 | " |
| Asbestos fibers | 0.85 | " | 0.85 | " | 0.85 | " |
| Thickener | 0.6 | " | 0.6 | " | 0.6 | " |
| Polyvinyl alcohol | 0.13 | " | 0.13 | " | 0.13 | " |
| Water | ~26 | " | ~36 | " | ~26 | " |

The ingredients were dry mixed to a substantially homogeneous state, added to the water and manually stirred to obtain a trowelable mix with complete and visually uniform wetting of the powder components. The wet mass was slaked for 30 minutes (except for that portion to be used in the set time test which was slaked for only 10 minutes), then remixed thoroughly before any evaluations were carried out.

A portion of the mortar was troweled onto the vertical surface of a dry cinderblock between guide strips ¼ inch thick. A Type B ceramic tile was lightly tapped onto the mortar surface immediately after application to the cinderblock with the back ribs of the tiles in vertical alignment. The position of the top edge of the tile was marked. Sag is the downward displacement of the tile measured 2 hours after placement on the mortar surface.

After another hour of slaking the mortar was troweled at room temperature and about 50% R.H. onto a section of gypsum wallboard and 10 Type A ceramic tiles were passed onto the mortar leaving 1.16 inch spacing between the tiles and wallboard. At 5-minute intervals at room temperature, a tile was twisted through a 90° angle back to its original position. Adjustability time was the longest at which a tile remains affixed to the mortar when tested in this manner. The characteristics of the cement are recorded in the following tables.

Table 1

Properties of Tile Cements (3) Modified with Phenylhydroxyethyl Hydroxyethyl Cellulose

| Example No. | HE M.S. | φ (2) D.S. | Adjustability (min.) | Sag (in.) | Set Time (hrs.) (Final) | Consistency (1) | Tack (1) | Cohesiveness (1) | Remarks |
|---|---|---|---|---|---|---|---|---|---|
| Hydroxyethyl cellulose Control |  |  |  |  |  |  |  |  |  |
| 1 | 2.48 | — | 25 | <1/16 | 11 | F | P | F | Grainy |
| 2 | 2.25 | 0.27 | 65 | — | 10.5 | P | G | G | Stringy |
| 3 | 1.73 | 0.13 | 65 | 1/16 | 10 | G | E | G |  |
| 4 | 1.48 | 0.09 | 65 | <1/16 | 9.5 | E | E | E |  |
| 5 | 2.16 | 0.19 | 45 | 1/4 | 9.5 | G | G | G | Stringy |
| 6 | 2.28 | 0.19 | 55 | >1/4 | 11 | G | G | G | Stringy |
| 7 | 2.34 | 0.14 | 65 | <1/16 | 9.5 | G | G | G |  |
| 8 | 2.39 | 0.07 | 65 | 1/8 | 10 | G | G | G |  |
| 9 | 1.45 | 0.15 | 65 | <1/16 | 9.5 | G | G | G | Sl. stringy |
| 10 | 1.55 | 0.19 | 65 | <1/16 | 9 | P | P | G | Stringy |
| 11 | 1.77 | 0 | 35 | 1/16 | 14 | F | P | F | Grainy |
| 12 | 1.85 | 0.28 | 65 | — | 9 | F | F | E | Stringy |
| 13 | 2.28 | 0.07 | 65 | 1/8 | 9 | G | G | G |  |
| 14 | 2.00 | 0 | 45 | 1/16 | 13 | F | P | F | Grainy |
| 15 | 2.20 | 0.07 | 65 | — | 9.5 | G | G | G |  |
| 16 | 1.61 | 0.06 | 65 | <1/16 | 10 | G | G | G |  |
| 17 | 2.5 | 0.07 | 65 | <1/16 | 9.5 | G | G | G |  |

(1) E = excellent; G = good; F = fair; P = poor; VP = very poor
(2) φ = phenylhydroxyethyl
(3) All tested with formula A Table 2

Properties of Tile Cements Modified with Benzyl Hydroxyethyl Cellulose

| Example (1) | HE M.S. | Benzyl D.S. | Adjustability (min.) | Sag (in.) | Set Time (hrs.) | Consistency (1) | Tack (1) | Cohesiveness (1) | Remarks |
|---|---|---|---|---|---|---|---|---|---|
| 18 | 2.3 | 0.08 | 65 | 1/4 | 9.5 | F | G | G | Sags |
| 19 | 2.03 | 0.14 | 65 | 1/8 | 9 | F | G | F | Stringy |
| 20 | 2.12 | 0.11 | 65 | 1/8 | 9 | F | G | F | Sags |
| 21 | 1.86 | 0.12 | 65 | 1/16 | 9.5 | G | G | F | Intermediate |
| 22 | 2.70 | 0.21 | 65 | 1/8 | 9 | P | G | G | Stringy |
| 23 | 2.38 | 0.07 | 65 | <1/16 | 10 | F | G | G | Intermediate |
| 24 | 1.70 | 0.07 | 65 | <1/16 | 10 | E | G | E | Close to Methocel |
| 25 | 1.87 | 0.09 | 65 | <1/16 | 9.5 | E | G | G | Intermediate |
| 26 | 2.87 | 0.12 | 65 | 1/8 | 9 | P | G | G | Poor consistency |
| 27 | 1.55 | 0.06 | 65 | <1/16 | 9 | E | E | E | Formula B |
| 28 | 1.55 | 0.06 | 60 | <1/16 | 9.5 | E | E | G | Formula C |

(1) 18 through 26 are Formula A

Table 3
Properties of Tile Cements (1)
Modified with Ethyl Hydroxyethyl Cellulose

| Ex. No. | Substitution HE M.S. | E D.S. | Adjustability | Sag | Set Time | Consistency | Tack | Cohesiveness |
|---|---|---|---|---|---|---|---|---|
| 29 | 1.73 | 0.9 | 65 | <1/16 | 11 | E | E | E |
| 30 | 2.08 | 0.95 | 65 | <1/16 | 12 | E | E | E |

(1) Both used Formula A

What I claim and desire to protect by Letters Patent is:

1. In a dry mortar-forming composition which consists essentially of about 24 to 99% by weight of hydraulic cement, about 0 to 75% sand, about 0 to 2% finely divided fibers, and about 0.4 to 4% of a water-retaining thickener, said dry composition being capable, when mixed with about 25 to 40% of its own weight of water, of producing a mortar which can be applied in thin layers for setting tile on walls and ceilings, the improvement which comprises said water-retaining thickener being a modified hydroxyethyl cellulose having hydroxyethyl M.S. between about 1.5 and 2.8 and a second substituent selected from the class consisting of a. phenylhydroxyethyl at a D.S. level between about 0.04 and 0.15 and b. benzyl at a D.S. level between about 0.04 and 0.15.

* * * * *